2,551,812

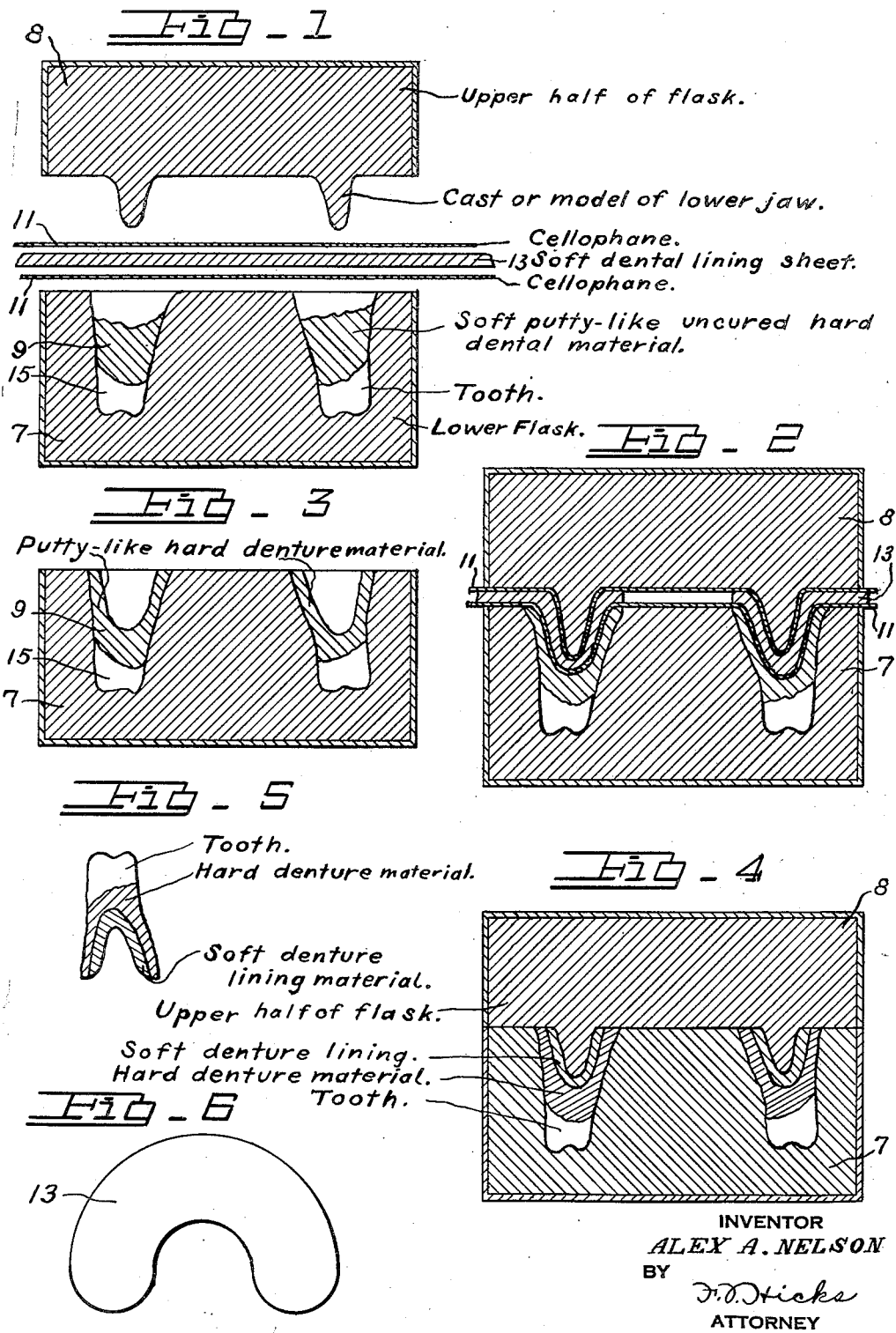
May 8, 1951 — A. A. NELSON — 2,551,812
PROCESS OF PREPARING AN ARTIFICIAL DENTURE
Filed July 14, 1947
INVENTOR
ALEX A. NELSON
BY F. D. Hicks
ATTORNEY Patented May 8, 1951

UNITED STATES PATENT OFFICE 2,551,812

PROCESS OF PREPARING AN ARTIFICIAL DENTURE

Alex A. Nelson, Pleasant Ridge, Mich.

Application July 14, 1947, Serial No. 760,860

1 Claim. (Cl. 18—55.1)

This invention pertains to artificial dentures with soft cushion linings and particularly to a process for making such dentures and to providing satisfactory attachment between the lining and the denture base material and is an improvement on my copending application Serial No. 619,421, now U. S. Patent No. 2,446,298.

Soft cushion linings for artificial dentures are an old art. In the early 1900's vellum soft rubber was used as a medium to attain this purpose when constructing vulcanic or hard rubber dentures, and because of the materials utilized no special problem was encountered in attachment between the linings and the base. In use such linings became approximately as hard as the base, distorted and cold flowed, and also became extremely foul in the mouth.

Attempts have been made to make latex rubber "overshoes" which were removable and which the patient could remove and cleanse in boiling water. But these "overshoes" soon shrank the inevitable 30 to 40 per cent and had to be abandoned.

Since 1926, vulcanite rubber has gone into a steady decline due to the advent of superior esthetic synthetic resins suitable for the purpose. Phenol-formaldehyde resins were used for a period of approximately ten years and then methylmethacrylate resins were introduced into the dental field. These later resins are far superior to any material the dental profession have had to work with for the construction of dentures, but are rather difficult to unite with other materials of a synthetic origin.

With the advent of the methacrylate resins, attempts were made to make soft linings by putting plasticizers into them which would make them flexible or by treating them with some of the other resins of the methacrylate or acrylate group, either in the monomer or polymer form. This was similar to the flexibilizing agents used in rubber to make them suitable for lining purposes in artificial dentures. Strange as it may seem, the same conditions as arose in the vellum rubber, arose with these plasticized acrylic linings. Although their union chemically was as good as the vellum rubber, they became foul, they became hard, and they cold flowed and distorted out of shape.

It is accordingly an object of this invention to produce artificial dentures having soft cushion linings which do not shrink or become foul, which are durable and do not separate or peel, and which do not become hard or distorted with use.

It is also an object of my invention to provide a process for making such improved artificial dentures having soft cushion linings which do not shrink, separate, peel, or become foul, hard, or distorted.

It is a further object of my invention to provide a process whereby such soft cushion lining materials in a convenient form for making improved artificial dentures may be economically and conveniently manufactured.

Further objects and advantages are within the scope of the invention, such as relate to the co-operative function of the parts and the materials of the structure, to various details of construction, to the process, and materials, as well as to economies of manufacture and other features, as will be apparent from a consideration of the specification in conjunction with the drawing in which:

Figs. 1 through 4 are cross-sectional views, between the first and second molars, showing how conventional dental apparatus is utilized for performing my improved process utilizing my improved materials;

Fig. 5 is an enlarged cross-sectional view through one side of the completed product showing an artificial denture made and provided with a soft cushion lining in accordance with my invention; and Fig. 6 is a plan view showing a trimmed sheet of the lining material.

In accordance with my invention, these difficulties are obviated by utilizing for the lining an elastomeric material, specifically a material of dissimilar nature from methyl methacrylate but however derived from the same family group, i. e. vinyl alcohol.

The material is composed of a vinyl chloracetate resin plasticized with butyl phthalyl butyl glycollate. Heat and light stabilizers, lubricant and coloring matter are added. This composition is thoroughly mixed by milling on calendar rolls and sheeting out into sheet form. It can be mixed in a Banbury mixer first and then sheeted out on the calendar rolls, or extruded, to proper thickness.

I have found that a combination of plasticizers can be used, giving various results as to flexibility and hardness, but butyl phthalyl butyl glycollate is necessary in this plasticizer mixture in order to secure proper chemical adhesion of the soft lining to the hard denture material. Other phthalate plasticizers can be used alone to make these sheets, but they give varying properties as related to the chemical union with the hard denture material as well as to their resistance to "sweating out" or leaching in the saliva. The best results for all factors concerned are obtained by the use of butyl phthalyl butyl glycollate alone. An excess of the plasticizer is provided in the sheet and the sheet is fully cured.

The procedure for the construction of these soft cushion linings, and for making artificial dentures having such linings, is as follows: The denture is prepared as usual for the construction of a regular hard methyl methacrylate denture by means of conventional dental apparatus. It is flasked as usual in the lower half 7 of a dental flask. The upper half 8 of the flask is placed in position and poured with plaster of Paris or artificial stone (dental), in a well known manner. The cover (not shown) is applied. After "boiling out" and cleansing of all wax, the case is packed with the prepared hard methyl methacrylate denture material 9 in puttylike condition. A sheet 11 of Cellophane is placed over this hard denture material and a suitably shaped and trimmed sheet 13 of the soft lining material of proper thickness, as previously described and as shown in Fig. 6, is placed over this sheet of Cellophane. This sheet of Cellophane is used to prevent union between the uncured methyl methacrylate of hard denture material and the soft lining at this stage of the process. Another sheet 11 of Cellophane is placed on top of the soft lining material. This piece of Cellophane is to prevent adhesion of the soft lining 13 to the plaster or stone model (representing the lower jaw) during the "test pack."

The lower half 7 of the flask is now placed in position. The flask is closed under pressure for another "test pack," as shown in Fig. 2. The flask is separated and, as may be seen in Fig. 3, the sheet of soft lining material 13 acted as a "shim" and made a place for itself in the "puttylike" uncured hard denture material. It did this by forcing out some of the uncured hard denture material. The soft lining material also adapted itself to the shape and contour of the model of the lower jaw which was held in the lower half of the flask.

The excess denture material is removed and all flash removed. Waste gates or traps are cut into the matrix walls of the mold. The model of the jaw is coated with tinfoil, wet Cellophane or some liquid type of separating and isolating medium and this plasticized vinyl resin sheet, that has been cut to shape and which was used as a shim to make room for itself in the uncured hard denture material (as explained in paragraph above) is applied directly to the uncured hard denture material.

The model half 8 of the flask which is a model of the jaw, is placed into position and the flask is closed, as represented in Fig. 4, and it is bolted together or placed in a flask press or suitable device to keep it in a closed position, in accordance with the usual practice. It is then placed in a pan of water and the common procedure in dental technology for processing methyl methacrylate denture material is carried out except that the temperature of the water should be brought to 212° F. and maintained for one hour after the low temperature procedure has been carried out.

After processing, the case is removed and allowed to cool in cold water. It is then removed from the flask in the manner common to denture construction. It is then trimmed down and polished in the usual manner for artificial dentures and, in order to secure a glossy and smooth surface to the edges of the soft lining that had to be trimmed or sanded down, ethyl acetate, acetone, or butyl acetate is applied to a coarse towel and vigorously rubbed on such portions of the soft lining, keeping away from the hard methacrylate as much as possible, until the soft material is smooth. During the process it may be found advantageous to paint the surface of the uncured hard denture material with a volatile solvent such as chloroform, acetone, monomeric methyl methacrylate or monomeric styrene. This is to freshen the surface of the denture base material which may have crusted over.

A cross-section of one side of the finished denture is shown in Fig. 5. This lining does not pick up the secretions of the mouth nor mucous food, nor does it become stiff. Since it does not pick up the fluids of the mouth, it does not become foul. Furthermore, it does not shrink or distort. The teeth 15 may be any commonly available artificial teeth of plastic, porcelain or other material.

It is to be understood that it is possible to make linings not only from plasticized vinyl chloracetate resin, but linings of this type can also be made from vinyl chloride and also from vinylidene chloride. Also I may utilize the vinyl chloride and vinylidine chloride of proper molecular weight usable as flexible type resins. It is my belief, however, that butyl phthalyl butyl glycollate is necessary in the plasticizers to cause complete chemical union with the hard methacrylate denture material.

While my invention may be advantageously utilized for the attachment of soft linings of this nature to methyl methacrylate dentures, like results can also be obtained with polystyrene, and the possibility exists of using vinyl chloracetate hard material or hard vinyl chloride material as a denture base material.

My process may also be utilized for providing a soft cushion lining and attaching it to a hard plastic denture already made, in which application it is necessary to remove sufficient of the old hard base material to permit a sufficient bulk of material to be added without raising the bite. Then a quantity of fresh prepared hard methacrylate material is applied sufficient to cover the whole removed area, as will be readily understood. Then the soft cushion lining is made and attached, as previously described.

It is apparent that within the scope of my invention variations may be made other than herein disclosed, the invention comprehending variations thereof.

What is claimed as the invention is:

A process of preparing an artificial denture comprising the steps: packing acrylic resin into one part of a two part denture mold, placing over said resin a thin sheet of separating medium, placing over said sheet at the open face of the mold a sheet of vinyl resin containing butyl phthalyl butyl glycollate plasticizer, closing the mold to shape the acrylic resin and preshape the vinyl resin sheet, opening the mold and removing said sheets and any excess acrylic resin therefrom, applying to the surface of the acrylic resin a volatile solvent therefor to soften the surface thereof, placing on said softened acrylic resin the preshaped vinyl resin sheet, again closing the mold and heating the mold and its contents up to about 212° F.

ALEX A. NELSON.

(References on following page)

REFERENCES CITED

The following references are of record in the file of this patent:

UNITED STATES PATENTS

| Number | Name | Date |
|---|---|---|
| 88,228 | Streeter | Mar. 23, 1869 |
| 1,990,903 | Groff | Feb. 12, 1935 |
| 2,101,431 | Groff | Dec. 7, 1937 |
| 2,120,755 | Kyrides | June 14, 1938 |
| 2,234,993 | Vernon et al. | Mar. 18, 1941 |
| 2,288,152 | Bjorksten | June 30, 1942 |

OTHER REFERENCES

Simonds Handbook of Plastics, Van Nostrand, 1943, pages 254–5.